(12) United States Patent
Ibukuro

(10) Patent No.: US 6,341,659 B1
(45) Date of Patent: Jan. 29, 2002

(54) POWER UNIT FOR A TWO-WHEELED VEHICLE

(75) Inventor: Hideo Ibukuro, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/362,862

(22) Filed: Jul. 29, 1999

(30) Foreign Application Priority Data

Jul. 29, 1998 (JP) .......................................... 10-213980

(51) Int. Cl.⁷ ................................................ F02B 61/02
(52) U.S. Cl. ....................................... 180/219; 180/230
(58) Field of Search ................................ 180/219, 227, 180/230, 231, 297, 376, 377, 378, 379, 374; 123/195 R, 195 HC, 197.4

(56) References Cited

U.S. PATENT DOCUMENTS

| | | | |
|---|---|---|---|
| 4,169,512 A | * 10/1979 | Ishikawa et al. | ......... 180/227 X |
| 4,505,352 A | * 3/1985 | Onda et al. | .................. 180/219 |
| 4,887,488 A | * 12/1989 | Miyazaki | ..................... 180/227 |
| 5,203,294 A | * 4/1993 | Takemura et al. | ..... 123/195 HC |
| 5,439,585 A | * 8/1995 | Arakawa | .................... 210/168 |

FOREIGN PATENT DOCUMENTS

| | | |
|---|---|---|
| DE | 807183 C2 | 10/1988 |
| DE | 022486 T2 | 9/1995 |
| DE | 302671 T2 | 5/1996 |
| DE | 501194 T2 | 12/1997 |
| EP | 402837 B1 | 12/1990 |
| EP | 610617 B1 | 8/1994 |
| EP | 699849 B1 | 3/1996 |
| JP | 403258921 A | * 11/1991 .................. 180/219 |
| JP | 1-163287 A | 8/1992 |

* cited by examiner

*Primary Examiner*—Kevin Hurley
(74) *Attorney, Agent, or Firm*—Birch, Stewart, Kolasch & Birch, LLP

(57) ABSTRACT

A swinging type power unit for a two-wheeled vehicle where the direction of the cylinders or an engine can be freely set without interfering with the engine crankcase so as to give greater freedom of design even when it is intended to increase power output by adopting a two cylinder configuration. The crankcase is divided by a partitioning surface passing through a central part of a crankshaft in the axial direction thereof and into a first crankcase half and a second crankcase half. An inner transmission case half of a transmission case is integrally formed with the first crankcase half and a cylinder block. The cylinder block has two cylinders running parallel in a horizontal direction of the vehicle which are joined to a mounting block surface formed at the outer peripheral surface of the crankcase.

12 Claims, 6 Drawing Sheets

POWER UNIT FOR A TWO-WHEELED VEHICLE

BACKGROUND OF THE INVENTION

1. Field of the Invention

The present invention relates to a power unit for a two-wheeled vehicle coupled in a freely swingable manner to a vehicle frame. In particular, the present invention is directed to improving a power unit provided on an engine with a crankshaft arranged in a lateral direction of the vehicle, a transmission case extending rearward from one end in a horizontal direction of the crankcase of the engine and axially supporting a rear wheel at a rear end part thereof, and a transmission housed in the transmission case coupling the crankshaft of the engine and the rear wheel.

2. Background Art

Conventionally, this kind of power unit for a two-wheeled vehicle is constructed for single cylinder engines; for example, refer to Japanese Patent Laid-open Publication No. Hei. 4-163287. The main object of the conventional art is to prevent the occurrence of interference of a power unit with a road surface during banking or rocking of the two-wheeled vehicle. This is accomplished by arranging an exhaust purifying device adjoined to an exhaust pipe of the two-wheeled vehicle which is positioned above a central line extending in a longitudinal direction as seen from a side view of the two-wheeled vehicle. Positioned thereunder is the power unit, being of the rockable swing type, such that the lateral placement thereof is sufficiently drawn inward to the body of the two-wheeled vehicle in order to prevent contact with the road surface when the two-wheeled vehicle is banked.

However, due to the positioning of the exhaust purifying device adjoined to the exhaust pipe, to allow placement of the power unit close to the frame of the two-wheeled vehicle, the conventional art two-wheeled vehicle is limited to single cylinder engines. Therefore, it is not possible to increase the engine power output by readily adopting a two cylinder engine configuration. Due to the lack of positioning freedom of the cylinders of the two cylinder engine caused by the exhaust purifying device adjoined to the exhaust pipe, the cylinders of the two cylinder engine can not be freely set without interfering with a crankcase of the two cylinder engine. Thus, implementation of a two cylinder engine with the two wheeled vehicle of the conventional art complicates a manufacturing cycle of the vehicle and further complicates assembly of the crankcase and cylinder block of the two cylinder engine.

SUMMARY OF THE INVENTION

In order the overcome the clear disadvantages of the conventional art, it is the object of the present invention to provide a power unit for a two-wheeled vehicle where the direction of the cylinders can be freely set without interfering with a crankcase of an engine so as to provide greater freedom of design when there is an intent to increase the engine power output by adopting a two cylinder configuration, and where manufacture and assembly of the crankcase and cylinder block are straightforward.

In order to achieve the above object, in a first aspect of the present invention, a power unit for a two-wheeled vehicle coupled in a freely swinging manner to a vehicle frame comprises an engine with a crankshaft arranged in a lateral direction of the vehicle, a transmission case extending rearwards from one end in a horizontal direction of the crankcase of the engine and axially supporting a rear wheel at a rear end part thereof, and a transmission housed in the transmission case coupling the crankshaft of the engine and the rear wheel. The crankcase is divided by a partitioning surface passing esentially through a central part of the crankshaft in the axial direction in such a manner that the crankcase comprises a first crankcase half and a second crankcase half. The transmission case is integrally formed with the first crankcase half and a cylinder block having two cylinders running parallel with the horizontal direction of the vehicle, and the cylinder block is joined with a block mounting surface formed at the outer peripheral surface of the crankcase. At the outer peripheral surface of the crankcase, the region forming a mounting block surface for connecting the cylinder block can be made broad without interfering with the transmission case. A degree of freedom can therefore be obtained for designing the angle of attachment of the cylinder block with respect to the crankcase and the power units.

In a second aspect of the present invention, journals supported by the crankcase are integrally formed with the crankshaft at just the two left and right ends thereof According to this second aspect, the crankshaft is integrally formed and the simplification of this structure is therefore achieved. Support of the crankshaft can therefore be carried out simultaneously with the joining of the first and second crankcase halves.

In addition to the first and second aspects, in a third aspect of the present invention, the transmission case is constructed by joining an inner transmission case half, integrally formed so as to extend from the first crankcase half, and an outer transmission case half positioned opposite the first crankcase half The partitioning surface is offset from a central position between the two cylinders to the side of the inner transmission case half. The width of the connected body of the first crankcase half and the inner transmission case half and the width of the second crankcase half are the same or substantially similar regardless of the inner transmission case being integrally formed with the first crankcase. Casting and cutting processes can therefore be carried out easily because the casting depth and processing depth is not deeper for one or the other of the connected body and the second crankcase.

In addition to the first to third aspects, in a fourth aspect of the present invention, an axis of the cylinder positioned on the side of the transmission case coincides with or is in the vicinity of a plane of the central rotation of a rear wheel. According to this fourth aspect, balancing of the weight to the left and right of the power unit can be achieved with respect to the rear wheel. This contributes to improved handling.

In addition to any one of the first to fourth aspects, in a fifth aspect of the present invention, the cylinders are arranged in a substantially flat manner with each head thereof facing towards the front of the vehicle. A low center of gravity can be achieved for the power unit. Further, as a broad space can be ensured above the engine, the power unit is appropriate for use in motor scooters and other two-wheeled vehicles with an accessory compartment arranged above the engine.

In addition to the first to fifth aspects, in a sixth aspect of the present invention, a timing transmission chamber is formed at the outer side of the cylinder and positioned on the opposite side of the transmission case. The timing transmission chamber houses a timing transmission assembly coupling the crankshaft and a moving cam shaft which is provided at the heads of the cylinders and being housed there. The spacing of the journals at both ends of the crankshaft can be kept to a minimum and the amount of overhang of an output end of the crankshaft linking to a transmission assembly can also be kept to a minimum.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

A preferred example of the present invention is now described based on an embodiment of the present invention shown in the appended drawings. However, the present invention is not limited to the embodiments shown in the figures. It is readily appreciated by those of ordinary skill in the art that the embodiments shown in the figures have been provided to merely illustrate the functionality of the present invention, and therefore should not be construed as limiting the scope of the claimed invention.

In the description hereinafter, front and rear, and left and right are taken with respect to the body of the motor scooter illustrated in the attached drawings.

Figure 1:
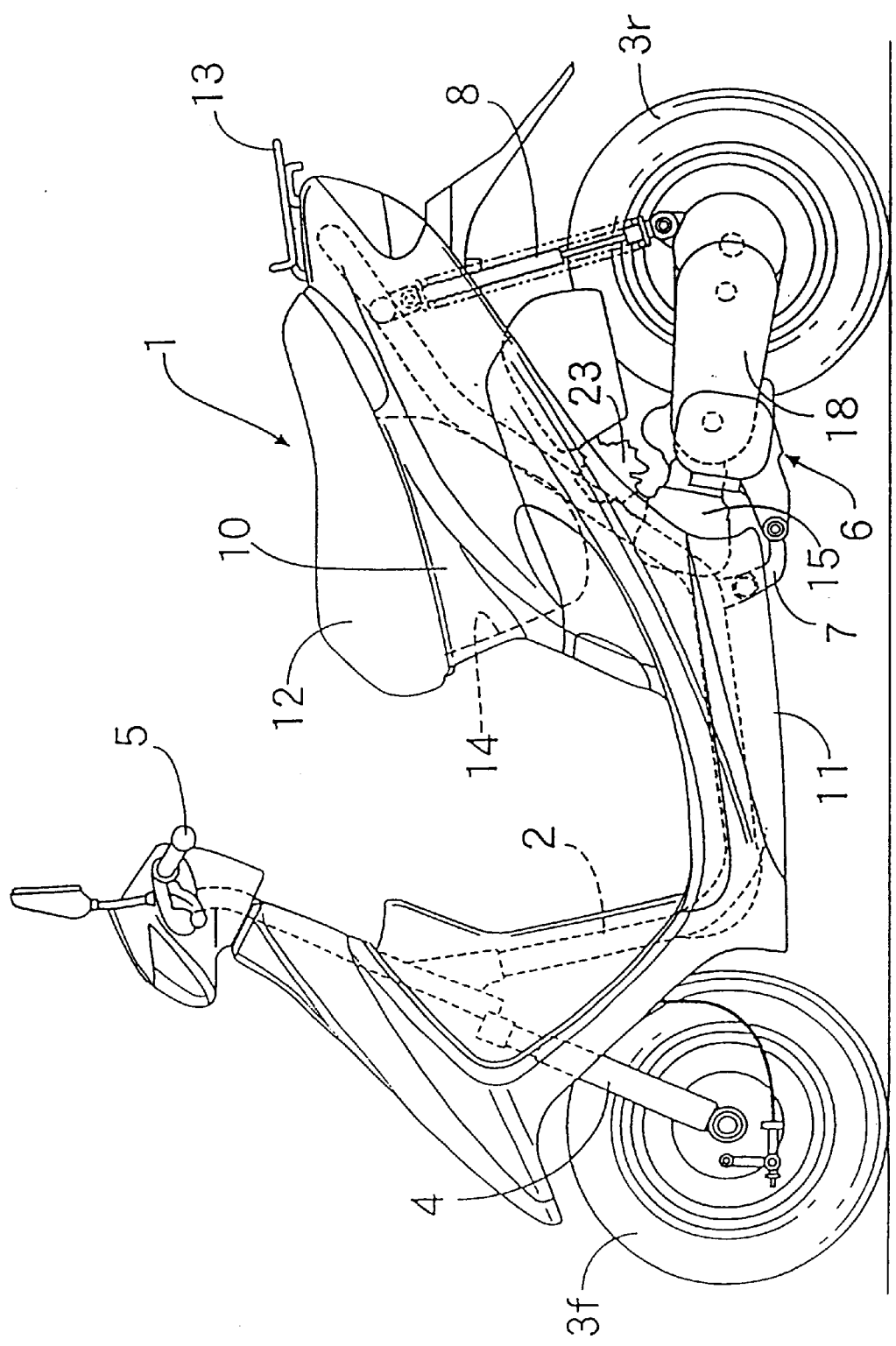
FIG. 1 is a side view of a motor scooter equipped with the power unit of the present invention.

As illustrated in FIG. 1, a front fork 4 supporting a front wheel 3f is coupled in a steerable manner at the front end of a vehicle frame 2 of a motor scooter 1. A steering handle 5 is attached to a steering system for the front fork 4. At the center of the vehicle frame 2, a power unit 6 supporting a rear wheel 3r is coupled in such a manner as to be capable of vertically swinging via a swinging link 7, with rear shock absorbers 8 being attached to the rear ends of the power unit 6 and the vehicle frame 2. A step 11, a seat 12 and a carrier 13 are provided on an outer vehicle plate 10 covering the vehicle frame 2. An accessory compartment 14, which is formed within the outer vehicle plate 10, is positioned directly under the seat 12.

Figure 2:
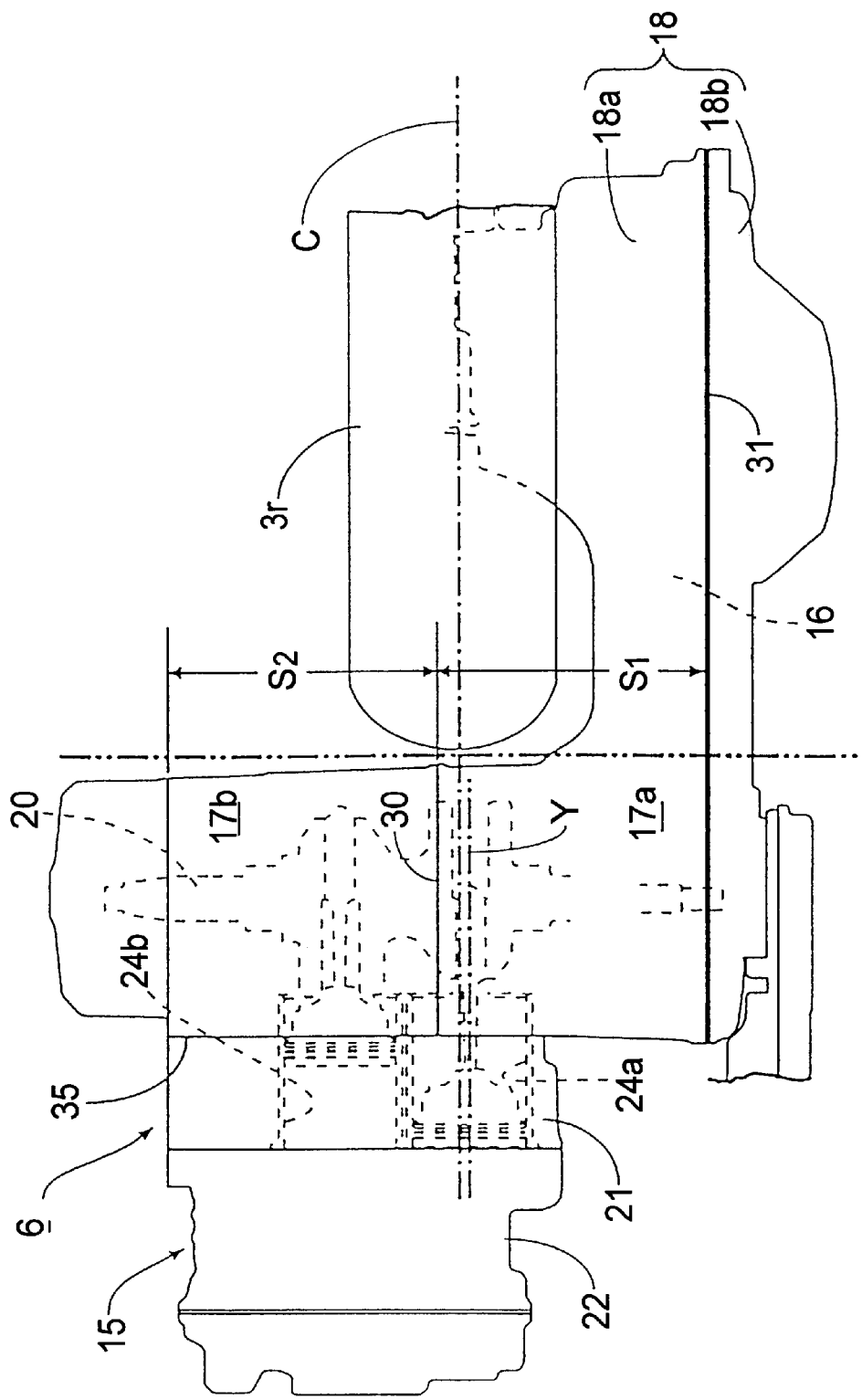
FIG. 2 is a plan view of the power unit.
Figure 3:
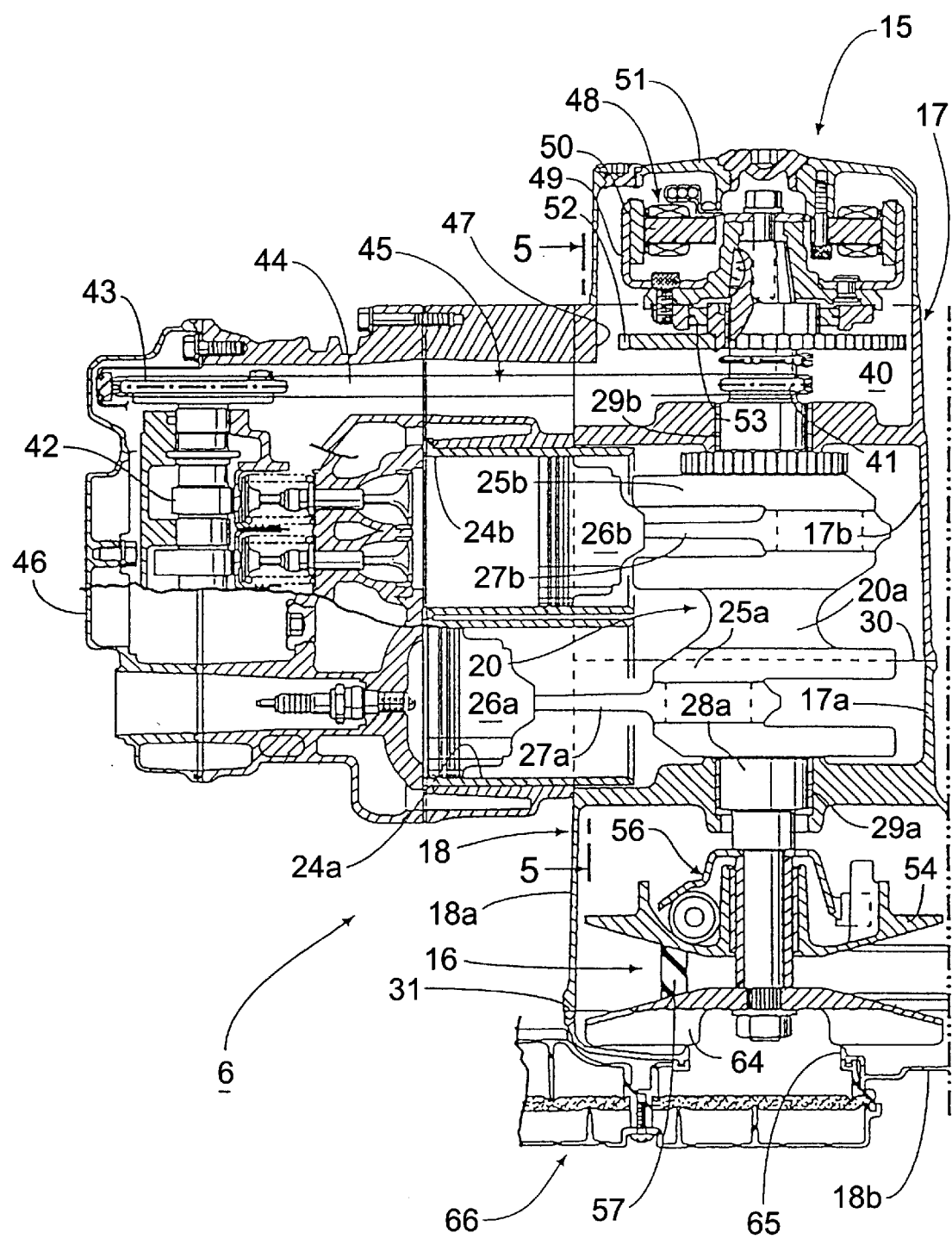
FIG. 3 is an enlarged vertical cross-section of the cylinder block and the crankcase in accordance with the power unit of the present invention.
Figure 4:
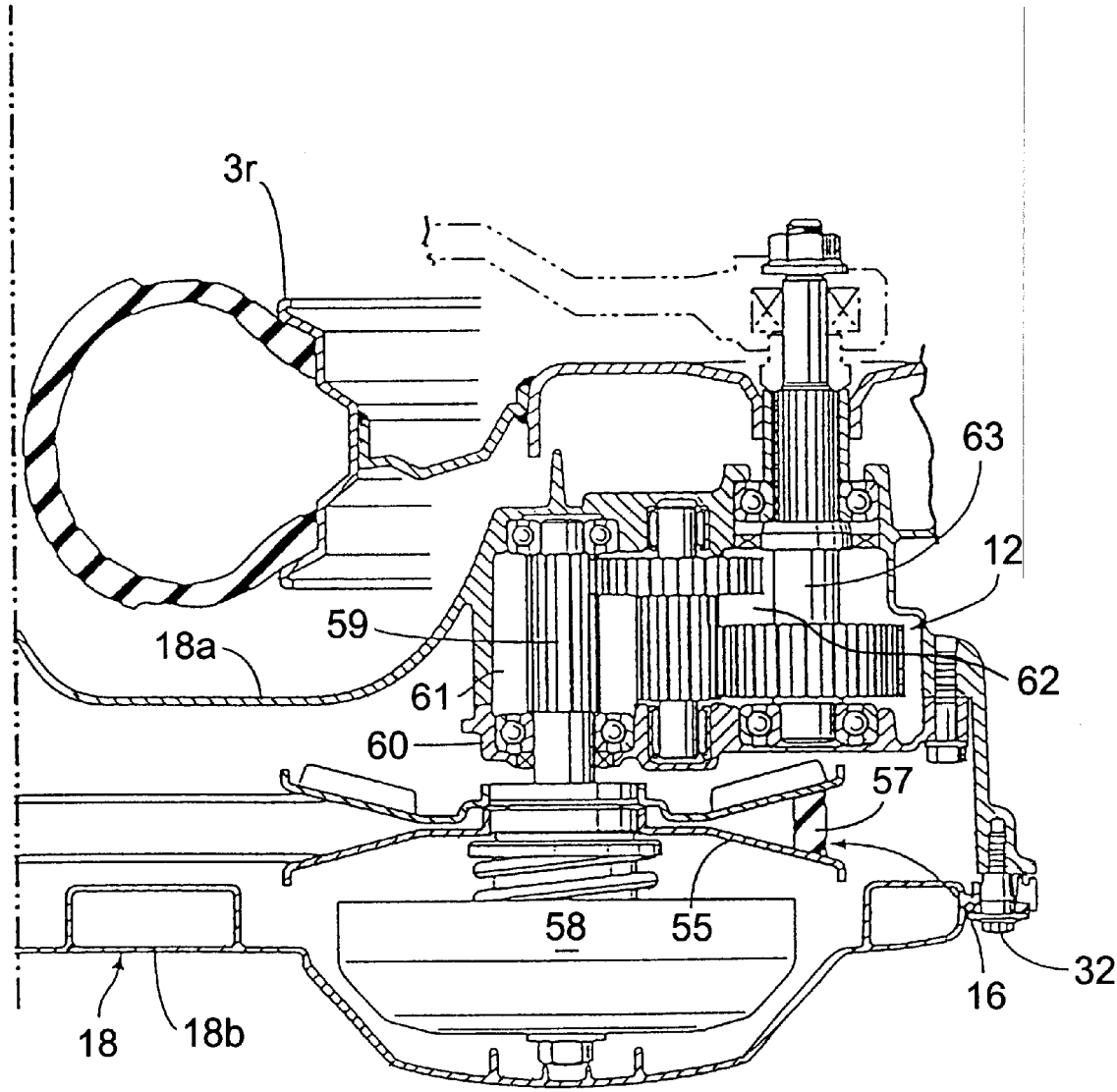
FIG. 4 is an enlarged vertical cross-section of the transmission case in accordance with the power unit of the present invention.

As illustrated in FIG. 2 to FIG. 4, the power unit 6 is equipped with a four cycle two cylinder engine 15 and a transmission 16 for transmitting power from the engine 15 to the rear wheel 3r. The transmission 16 is housed in a transmission case 18 extending forward from the left-side end of a crankcase 17 of the engine 15, with the rear wheel 3r being supported at the rear end of the transmission case 18.

The engine 15 is equipped with an integrated crankshaft 20 arranged with an axis thereof and extending across the vehicle body, a crankcase 17 for bearing the crankshaft 20, a cylinder block 21 connected to the outer peripheral surface of the crankcase 17, a cylinder head 22 connected to the upper surface of the cylinder block 21, and a carburetor 23 (refer to FIG. 1) mounted on the outside surface of the cylinder head 22. Two cylinders 24a and 24b are provided in parallel to the left and right of the cylinder block 21. Two corresponding cranks 25a and 25b are formed left and right of the crankshaft 20, and pistons 26a and 26b positioned in the cylinders 24a and 24b are connected to the corresponding cranks 25a and 25b via connecting rods 27a and 27b. The crankshaft 20 has journals 28a and 28b at two neighboring places on the outside of the cranks 25a and 25b. These journals 28a and 28b support the crankcase 17 via bearing members 29a and 29b. Namely, an intermediate axis 20a of the crankshaft 20 coupled between the two cranks 25a and 25b is not supported at the crankcase 17 and therefore has a larger diameter than the journals 28a and 28b in order to maintain bending rigidity thereof.

The crankcase 17 comprises a first crankcase half 17a, partitioned in a vertical direction by a partitioning surface 30 offset from a central position between the two cylinders 24a and 24b towards the side of the transmission case 18, and is positioned at the side of the transmission case 18. A second crankcase half 17b is positioned on the side of the transmission case 18 opposite the first crankcase 17a. The transmission case 18 comprises an inner transmission case half 18a, partitioned by a partitioning surface 31 parallel to the partitioning surface 30, and an outer transmission case half 18b positioned on the opposite side thereof. The inner transmission case half 18a and the first crankcase half 17a are integrally cast together.

The first and second crankcase halves 17a and 17b are connected together by a plurality of bolts (not shown) at peripheral edges thereof, and the inner and outer transmission case halves 18a and 18b are connected together by a plurality of bolts 32 at the peripheral edges thereof The assembly for the crankcase 17 and the transmission case 18 is divided into three simple steps. First, the assembly of the first half 17a with the inner transmission case half 18a; second the assembly of the second crankcase half 17b with the first half 17a. Finally the attachment of the outer transmission case half 18b with the inner transmission case half 18a. Subsequently, the number of parts for the assembly is therefore kept to a minimum and the casting of each of the parts is kept straightforward.

Since the journals 28a and 28b supported at the first and second crankcase halves 17a and 17b are formed with two end points of the integrated crankshaft 20, supporting of the crankshaft 20 can be carried out simultaneously via the connectivity of the first and second crankcase halves 17a and 17b, regardless of the crankshaft 20 being integrally formed.

Further, as illustrated in FIG. 2, the partitioning surface 30, partitioning the inner transmission case half 18a, and the first crankcase half 17a from the second crankcase half 17b, is arranged in such a manner as to be offset from a central position between the two left and right cylinders 24a and 24b to the side of the inner transmission case half 18a. The width S1 of the connected body of the first crankcase half 17a, and the inner transmission case half 18a, and a width S2 of the second crankcase half 17b are therefore the same or similar. Casting and cutting processes can therefore be carried out easily because the casting depth and processing depth is not deeper for one or the other of the connected body and the second crankcase 17b.

The power unit 6 is arranged in such a manner that an axis Y of the cylinder 24a, on the side of the transmission case 18 coincides with or is in the proximity of a plane of central rotation C of the rear wheel 3r. As a result, weight balancing to the left and right of the power unit 6 with respect to the rear wheel 3r can be achieved and thus handling can be improved.

Figure 5:
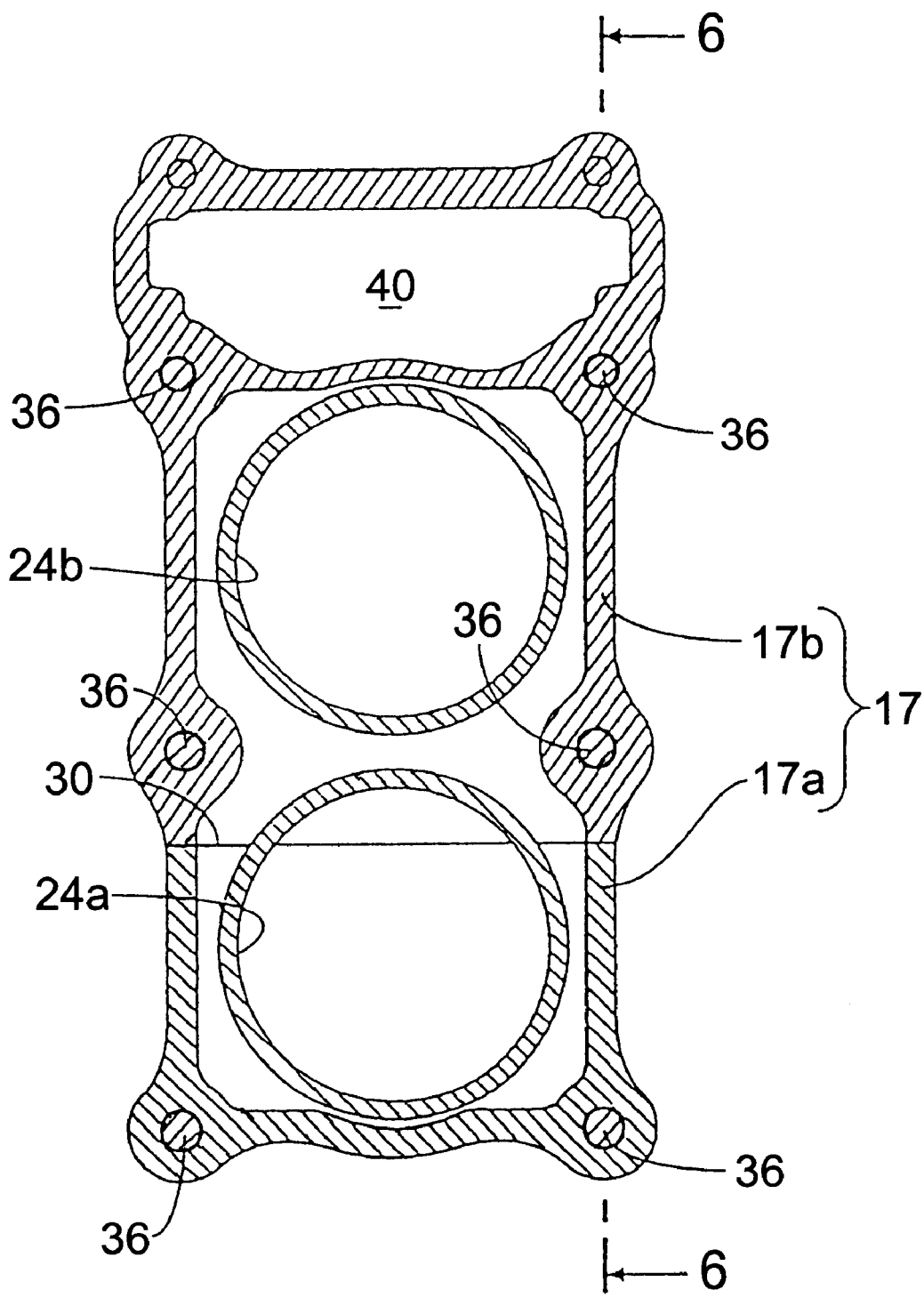
FIG. 5 is a cross-section taken along line 5—5 of FIG. 3.
Figure 6:
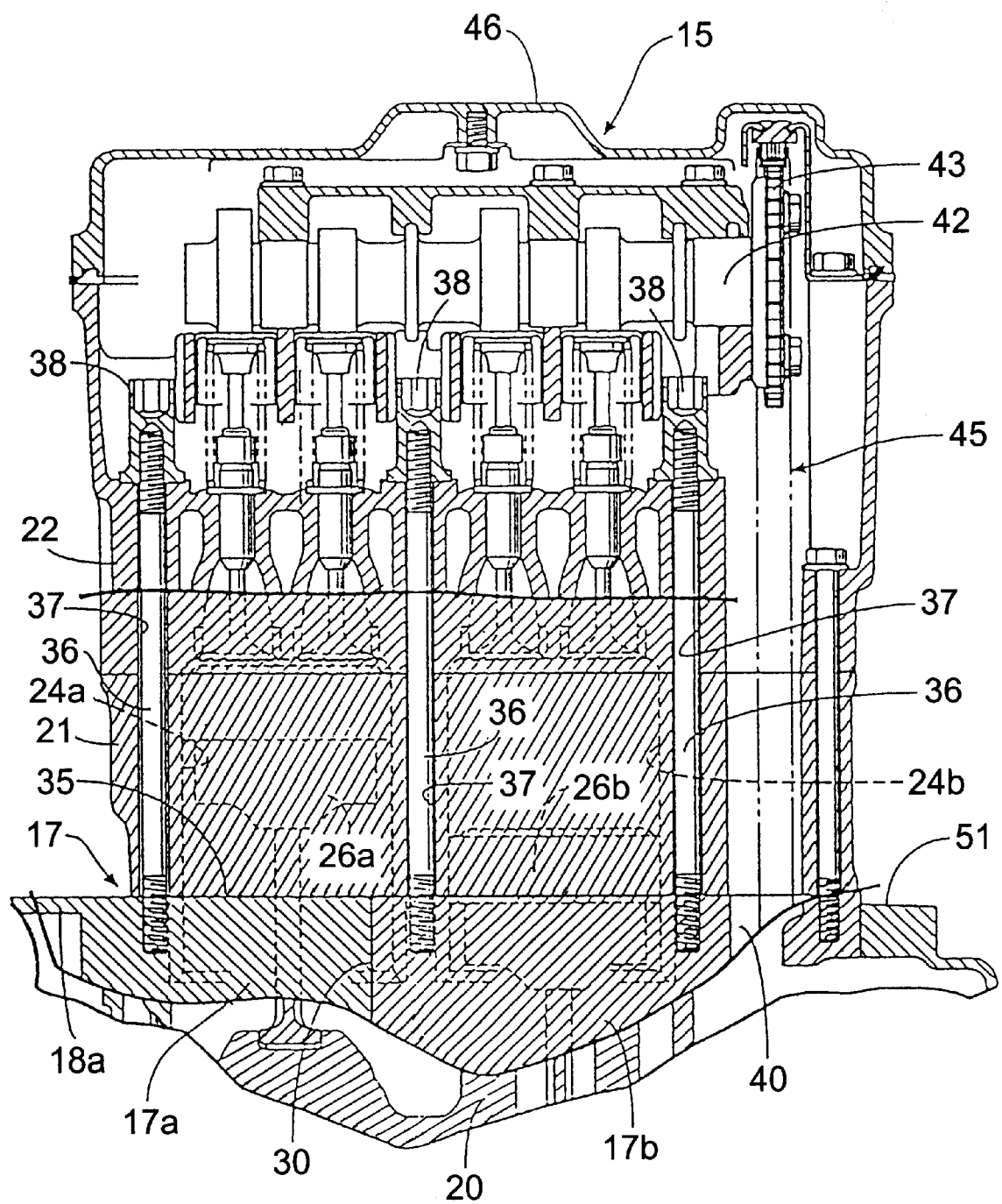
FIG. 6 is a cross-section taken along line 6—6 of FIG. 5.

As illustrated in FIG. 3, FIG. 5 and FIG. 6, a mounting block 35 is formed at the outer peripheral surface of the crankcase 17, in particular, the front part in the embodiment shown in the drawings. Six stud bolts 36 are embedded in the crankcase 17 in such a manner as to encompass the two cylinders 24a and 24b. These stud bolts 36 are inserted into six bolt holes 37 passing through the cylinder block 21 and the cylinder head 22. Nuts 38 are then screwed and tightened at the ends of the stud bolts 36 so that the cylinder block 21 and the cylinder head 22 are joined to the crankcase 17. The head of the cylinder block 21 is arranged substantially horizontally facing towards the front of the motor scooter 1.

Since the mounting block 35 is formed at the outer peripheral surface of the crankcase 17, this forming region can be kept slightly broader at the transmission case 18. The angle of attachment of the cylinder block 21 with respect to the crankcase 17 can therefore be selected with a greater degree of freedom, and various kinds of power units compatible with various types of two-wheeled vehicles of different forms can be easily implemented.

In particular, as shown in the drawings, the cylinder block 21 is connected at the mounting block 35 formed at the front surface of the crankcase 17. A low center of gravity is obtained for the power unit 6 when this is arranged in a substantially horizontal manner. In addition, a broad space can be maintained above the engine 15. It is therefore possible to form a large accessory compartment 14 for housing helmets, etc., above the engine 15.

As illustrated in FIG. 3 and FIG. 5, a timing transmission chamber 40 is formed next to the outer side of the cylinder 24b on the opposite side to the transmission case 18 at the cylinder block 21 and the cylinder head 22. A timing transmission assembly 45 comprising a drive sprocket 41 fixed to the crankshaft 20, a driven sprocket 43 fixed to a valve cam shaft 42 supported at the cylinder head 22, and a chain 44 wrapped around sprockets 42 and 43, is arranged in the timing transmission chamber 40. A head cover 46 covering a valve assembly including the moving cam shaft 42 is connected at the front surface of the cylinder head 22.

As a result, the spacing of the left and right journals 28a and 28b of the crankshaft 20 can be kept to a minimum, and the arrangement of the timing transmission assembly 45 can be carried out in a straightforward manner while keeping the extent of overhang of the output end connected to the transmission 16 of the crankshaft 20 to a minimum.

An opening 47 for opening the timing transmission chamber 40 is provided at an outer side wall of the second crankcase half 17b. A rotor 49 of a dynamo 48 is fixed at the right end of the crankshaft 20 protruding outside of the opening 47. A stator of the dynamo 48 is fixed to an inner wall of a side cap 51 connected to the second crankcase half 17b for closing the opening 47. A large diameter gear 52 driven from a starter motor (not shown) is provided in a freely rotatable manner between the timing transmission assembly 45 and the dynamo 48. An overlying clutch 53 is interposed between the large diameter gear 52 and the rotor 49.

The transmission 16 is equipped with a variable radius drive pulley 54 attached to the output end of the crankshaft 20, a variable diameter driven pulley 55 attached to an intermediate transmission shaft 59 supported at the rear end of the inner transmission case half 18a, and a belt 57 wrapped around the drive and driven pulleys 54 and 55. A centrifugal transmission mechanism 56 for increasing the diameter of the pulley in response to increases in the rotational speed of the crankshaft 20 is provided at the drive pulley 54, and a centrifugal clutch 58 which facilitates the connection state in response to increases in the rotational speed of the driven pulley 55 is interposed between the driven pulley 55 and the transmission 18.

A partition wall 60 is joined to the inner wall at the rear end of the inner transmission case half 18a, so as to define a deceleration chamber 61 therebetween. The intermediate transmission shaft 59 is also supported by this partition wall 60. Further, a rear wheel drive shaft 63 is supported by the partition wall 60 and the inner transmission case half 18a, and a gear reduction assembly 62 coupling the intermediate transmission shaft 59 and the rear wheel drive shaft 63 is provided in the deceleration chamber 61. The rear wheel 3r is spline-fitted to the outer end of the rear wheel drive shaft 63 in a detachable manner.

When the engine 15 is operating, this power is transmitted to the rear wheel 3r from the crankshaft 20 sequentially via the drive pulley 54, the belt 57, the driven pulley 55, the centrifugal clutch 58, the intermediate transmission shaft 59, the gear reduction assembly 62 and the rear wheel drive shaft 63, so as to drive the rear wheel 3r. During this time, the engine 15 can run at a high output by means of the two cylinders 24a and 24b.

A cooling fan 64 is integrally formed at the outer surface of the drive pulley 54. A cooling air inlet 65 facing the cooling fan 64 is provided at a sidewall of the outer transmission case half 18b. An air cleaner 66 is installed at the cooling air inlet 65. When the cooling fan 64 rotates, outside air filtered by the air cleaner 66 enters into the transmission case 18 from the cooling air inlet 65, and is released to the outside from an exhaust outlet (not shown) after cooling each of the parts of the transmission 16.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power unit for a two-wheeled vehicle coupled in a freely swinging manner to a vehicle frame, said power unit comprising:

an engine;

a crankcase being integrally attached to said engine;

a crankshaft disposed within said crankcase and being laterally arranged with respect to said engine, said crankshaft having a plurality of cranks attached to first and second pistons, respectively, said pistons being positioned in first and second cylinders;

a transmission case extending rearward from said crankcase, said transmission case axially supporting a rear wheel at a rear end part thereof; and a transmission housed in said transmission case coupling the crankshaft of said engine and the rear wheel, wherein said crankcase is divided by a partitioning surface offset from a central position between said first and second cylinders thereby forming first and second crankcase halves.

2. The power unit as defined in claim 1, wherein said transmission case is integrally formed with said first crankcase half and a cylinder block having said first and second cylinders positioned essentially parallel in an essentially horizontal direction with the cylinder block, wherein said first and second cylinders are joined with a mounting block surface being formed at an outer peripheral surface of said crankcase.

3. The power unit as defined in claim 1, wherein a crank is formed on each lateral side of said crankshaft, said crankshaft has journals positioned on the outside of each of said crank, wherein said journals support said crankshaft via a plurality of bearing members of said crankcase.

4. The power unit as defined in claim 1, wherein said transmission case comprises an inner transmission case half being integrally formed so as to extend from the first crankcase half, and an outer transmission case half being positioned opposite the first crankcase half and connected to said inner transmission case half, whereby a combined width of said first crankcase half and said inner transmission case is equal to a width of said second crankcase half.

5. The power unit as defined in claim 2, wherein an axis of one of said first and second cylinders is positioned on a side of said transmission case coinciding with or in a vicinity of a plane of central rotation of the rear wheel.

6. The power unit as defined in claim 2, wherein said first and second cylinders are arranged in a substantially flat manner with each cylinder head thereof positioned along said horizontal direction of said cylinder block.

7. The power unit as defined in claim 2, further comprising a timing transmission chamber being formed at an outer side of one of said first and second cylinders and is positioned on a side of said transmission case.

8. The power unit as defined in claims 7, wherein said timing transmission chamber houses a timing transmission assembly comprising a drive sprocket being fixed to the crankshaft, and a driven sprocket fixed to a valve cam shaft supported by a cylinder head of the cylinder block.

9. A power unit for a vehicle, said power unit comprising:

an engine;

a transmission being in communication with said engine, said transmission for communicating power output from said engine to a drive means;

a transmission case housing said transmission, said transmission case extending from a portion of said engine; and a crankcase integrally connected to said transmission case, said crankcase having a first crankcase half and a second crankcase half being defined by a partitioning surface being offset from a central position between two cylinders and in a direction towards said transmission case, wherein a cylinder block of said engine is positioned along a line being essentially horizontal to said transmission case, said cylinder block having two cylinders being arranged parallel to one another and positioned along the same horizontal line with said transmission case, whereby when said two cylinders are viewed from a perspective of a cylinder head of said engine, said two cylinders are side-by-side with respect to a line running essentially perpendicular to said horizontal line.

10. The power unit as defined in claim 9, wherein said transmission case comprises an inner transmission case and an outer transmission case, said inner and outer transmission cases being partitioned by another partitioning surface.

11. The power unit as defined in claim 9, wherein said engine includes an integrated crankshaft having two cranks, each of said two cranks being positioned on opposite facing lateral sides of said crankshaft, said crankshaft having a journal positioned outside of each of said two cranks, wherein said journal of each of said two cranks supports a crankcase of said engine.

12. The power unit as defined in claim 10, wherein said first crankcase half is adjoined with said inner transmission case, and a combined width thereof is equal to a width of said second crankcase half.

* * * * *